(12) United States Patent
Taguchi

(10) Patent No.: US 8,835,336 B2
(45) Date of Patent: Sep. 16, 2014

(54) OPTICAL GLASS AND OPTICAL ELEMENT

(75) Inventor: Yoshihito Taguchi, Hachioji (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/512,511

(22) PCT Filed: Sep. 15, 2010

(86) PCT No.: PCT/JP2010/065961
§ 371 (c)(1),
(2), (4) Date: May 29, 2012

(87) PCT Pub. No.: WO2011/065097
PCT Pub. Date: Jun. 3, 2011

(65) Prior Publication Data
US 2012/0238436 A1    Sep. 20, 2012

(30) Foreign Application Priority Data

Nov. 26, 2009   (JP) .................................. 2009-268462

(51) Int. Cl.
*C03C 3/068*   (2006.01)
(52) U.S. Cl.
CPC ..................................... *C03C 3/068* (2013.01)
USPC .......................................................... 501/78

(58) Field of Classification Search
USPC ............................................................ 501/78
See application file for complete search history.

(56) References Cited

U.S. PATENT DOCUMENTS

| | | | |
|---|---|---|---|
| 2004/0145815 A1 | 7/2004 | Endo | |
| 2005/0197243 A1 | 9/2005 | Hayashi | |

FOREIGN PATENT DOCUMENTS

| | | | |
|---|---|---|---|
| DE | 3201346 | * | 7/1983 |
| JP | 57-38342 | | 3/1982 |
| JP | 60-33229 | | 2/1985 |
| JP | 8-217484 | | 8/1996 |
| JP | 09-278480 | | 10/1997 |
| JP | 2004-175632 | | 6/2004 |
| JP | 2005-179142 | | 7/2005 |
| JP | 2005-247613 | | 9/2005 |
| JP | 2006-248897 | | 9/2006 |
| JP | 2007-153734 | | 6/2007 |
| WO | 9832706 | * | 7/1998 |

* cited by examiner

*Primary Examiner* — Karl Group
(74) *Attorney, Agent, or Firm* — Cozen O'Connor

(57) ABSTRACT

Provided with the following glass components: 8 to 19.5% $B_2O_3$, 4.5 to 9% $SiO_2$, 0 to 10% $GeO_2$, 7 to 12.5% BaO, 0 to 14% MgO, 0 to 0.4% $Li_2O$, 15 to 34% $La_2O_3$, 3.5 to 10% $Y_2O_3$, 8 to 13.5% $TiO_2$, 0 to 7% $ZrO_2$, 0 to 11% $Nb_2O_5$, and 1 to 9% $WO_3$ by weight, wherein $B_2O_3/SiO_2$ is at least 1.0, $La_2O_3+Y_2O_3+ZrO_2+Nb_2O_5+WO_3$ is no more than 54%, and $B_2O_3+SiO_2+GeO_2+BaO+MgO+Li_2O+La_2O_3+Y_2O_3+TiO_2+ZrO_2+Nb_2O_5+WO_3$ is at least 98%.

22 Claims, No Drawings

OPTICAL GLASS AND OPTICAL ELEMENT

This is a U.S. National Phase Application under 35 USC 371 of International Application PCT/JP2010/065961 filed on Sep. 15, 2010.

This application claims the priority of Japanese Application No. 2009-268462 filed Nov. 26, 2009, the entire content of which is hereby incorporated by reference.

TECHNICAL FIELD

The present invention relates to optical glasses and optical elements. More particularly, the present invention relates to optical glasses suitable for press-molding, and to optical elements made of such optical glasses.

BACKGROUND ART

In recent years, size reduction has been rapidly progressing in optical devices for digital cameras, cellular phones, and the like. Making optical devices compact requires making the lenses used in them thin, and making lenses thin requires using optical glasses with high refractive indices.

On the other hand, as a technology that allows comparatively easy molding of glass into difficult-to-form shapes, such as aspherical surfaces, much attention has been paid to so-called press-molding (precision press-molding), whereby glass heated to above its softening point is pressed to be directly molded into a lens by use of a heated press mold consisting of a pair of upper and lower pieces.

Press-molding roughly divides between a re-heating method and a direct-press method. In the re-heating method, a gob preform or polished preform having approximately the shape of the end product is fabricated, is then re-heated to above the softening point, and is then pressed to be molded into the shape of the end product by use of a heated mold consisting of upper and lower pieces. On the other hand, in the direct-press method, molten glass is directly dripped into a heated mold from a glass melting furnace and is then pressed to be molded into the shape of the end product.

In the direct-press method described above, when the molten glass is dripped, typically, a nozzle made of platinum or the like is used. The weight of the glass dripped is controlled by controlling the temperature of the nozzle. For glasses with low liquid phase temperatures (TL), the nozzle temperature can be set in a wide range of temperature, from high to low, and this makes it possible to fabricate optical elements of varying sizes, from large to small. By contrast, for glasses with high liquid phase temperatures (TL), failing to keep the nozzle temperature equal to or above the liquid phase temperature (TL) causes the glass to devitrify, and this inconveniently hampers stable dripping.

Moreover, glasses with high liquid phase temperatures (TL) themselves need to be at high temperatures when dripped, and this makes the press mold prone to oxidation at the surface and a change in the metal composition, shortening the life of the mold. This leads to higher production costs. Molding may be performed in an atmosphere of an inert gas such as nitrogen to alleviate deterioration of the mold, but then controlling the atmosphere requires complicated molding equipment, and in addition the inert gas inflicts its own running cost, leading to higher production costs. Thus, glasses used in press-molding are required to have as low a liquid phase temperature (TL) as possible.

Molding an optical glass with a high refractive index as mentioned above by press-molding involves using a glass ingredient containing PbO or $TeO_2$. Today, however, PbO and $TeO_2$ are suspected to be hazardous to human health, and technologies have been studied and proposed for obtaining glasses with high refractive indices without using PbO or $TeO_2$ (see, for example, Patent Documents 1 to 4 listed below).

LIST OF CITATIONS

Patent Literature

Patent Document 1: JP-A-H9-278480
Patent Document 2: JP-A-2005-247613
Patent Document 3: JP-A-2006-248897
Patent Document 4: JP-A-2007-153734

SUMMARY OF INVENTION

Technical Problem

Conventional optical glasses have high refractive indices, indeed, but their liquid phase temperatures (TL) are not satisfactorily low. An unsatisfactorily low liquid phase temperature (TL) causes glass to devitrify inside the nozzle and clog it, much like arteriosclerosis. This inconveniently makes stable dripping of glass and press-molding impossible.

Moreover, conventional optical glasses also have small numbers of Vickers hardness (Hv). A small number of Vickers hardness (Hv) implies that, when glass molded by press-molding is subjected to processing such as center alignment, a crack or a chip may develop on the ground surface. The greater the number of Vickers hardness (Hv), an indicator of hardness of glass, the less likely a crack or a chip develops, and thus the higher the proportion of products that turn out to be acceptable after processing of glass, leading to improved productivity.

The present invention has been devised against the above background, and aims to provide optical glasses that, despite containing substantially no PbO or $TeO_2$, have high refractive indices and promise high productivity, and to provide optical elements made of such optical glasses.

Solution to Problem

Through intensive studies with a view to achieving the above aim, the present inventor has found that, by using $B_2O_3$, $SiO_2$, BaO, $La_2O_3$, $Y_2O_3$, $TiO_2$, and $WO_3$ as essential ingredients and keeping their respective contents in glass within predetermined ranges, it is possible to obtain an optical glass that, while maintaining determined optical constants, has a liquid phase temperature (TL) low enough to ensure satisfactory dripping properties of molten glass in combination with a Vickers hardness (Hv) high enough to make a crack in a succeeding process less likely. This finding has led the inventor to the present invention.

Specifically, according to a first aspect of the invention, an optical glass contains the following glass ingredients, by weight: 8% to 19.5% of $B_2O_3$; 4.5% to 9% of $SiO_2$; 0% to 10% of $GeO_2$; 7% to 12.5% of BaO; 0% to 14% of MgO; 0% to 0.4% of $Li_2O$; 15% to 34% of $La_2O_3$; 3.5% to 10% of $Y_2O_3$; 8% to 13.5% of $TiO_2$; 0% to 7% of $ZrO_2$; 0% to 11% of $Nb_2O_5$; and 1% to 9% of $WO_3$. Here, $B_2O_3/SiO_2$ equals 1.0 or more, $La_2O_3+Y_2O_3+ZrO_2+Nb_2O_5+WO_3$ equals 54% or less, and $B_2O_3+SiO_2+GeO_2+BaO+MgO+Li_2O+La_2O_3+Y_2O_3+TiO_2+ZrO_2+Nb_2O_5+WO_3$ equals 98% or more. In the present description, unless otherwise stated, "%" stands for "percent by weight."

According to a second aspect of the invention, the optical glass according to the first aspect described above has a refractive index (nd) in the range of 1.83 to 1.94, an Abbe number (vd) in the range of 26 to 35, a liquid phase temperature (TL) of 1000° C. or less, and a Vickers hardness (Hv) of 770 or more.

According to a third aspect of the invention, an optical element is made of the optical glass according to the first or second aspect described above. Examples of such optical elements include lenses, prisms, and mirrors.

According to a fourth aspect of the invention, an optical element is fabricated by press-molding the optical glass according to the first or second aspect described above.

Advantageous Effects of the Invention

An optical glass according to the present invention, owing to its containing predetermined glass ingredients in predetermined amounts, offers high-refraction, low-dispersion optical constants despite containing no compounds, such as PbO and $TeO_2$, that are hazardous to human health; in addition, it has a low liquid phase temperature (TL), ensuring satisfactory dripping properties of molten glass, and a high Vickers hardness (Hv), making a crack in a succeeding process less likely. An optical element according to the invention is fabricated by press-molding such an optical glass; it thus, while offering the properties of the optical glass, contributes to high productivity and low costs.

DESCRIPTION OF EMBODIMENTS

Hereinafter, as to the ranges of the contents of different ingredients in optical glasses according to the present invention, the reasons for restricting them as noted above will be described along with other features.

$B_2O_3$ is an essential ingredient of an optical glass according to the invention, and is one which forms the skeleton of the glass (a glass former). A $B_2O_3$ content less than 8% makes the glass unstable, making it highly prone to devitrification. By contrast, a $B_2O_3$ content more than 19.5% results in a low refractive index, making it impossible to obtain desired optical constants. Accordingly, a preferred range of the $B_2O_3$ content is 8% to 19.5%. A further preferred range of the $B_2O_3$ content is 9% to 19.4%, a particularly preferred range being 11% to 19.4%.

$SiO_2$, like $B_2O_3$, is an essential ingredient of an optical glass according to the invention, and is one which forms the skeleton of the glass (a glass former). A $SiO_2$ content less than 4.5% makes the glass unstable, making it highly prone to devitrification; it also makes it impossible to obtain a sufficient effect of increasing the Vickers hardness. By contrast, a $SiO_2$ content more than 9% results in a low refractive index, making it impossible to obtain desired optical constants. Accordingly, a preferred range of the $SiO_2$ content is 4.5% to 9%. A further preferred range of the $SiO_2$ content is 4.5% to 8%, a particularly preferred range being 4.5% to 7%.

The content ratio $B_2O_3/SiO_2$ of $B_2O_3$ to $SiO_2$ is preferably 1.0 or more from the viewpoints of meltability and resistance to devitrification.

$GeO_2$ has an effect of increasing the refractive index. A $GeO_2$ content more than 10%, however, diminishes resistance to devitrification, and raises the liquid phase temperature (TL). Accordingly, a preferred range of the $GeO_2$ content is 0% to 10%. A further preferred range of the $GeO_2$ content is 0% to 8%, a particularly preferred range being 0% to 6%.

BaO is an essential ingredient of an optical glass according to the invention, and has effects of improving resistance to devitrification and increasing the refractive index; it also lowers the liquid phase temperature (TL) and increases the number of Vickers hardness. A BaO content less than 7% does not provide these effects satisfactorily. By contrast, a BaO content more than 12.5% results in low dispersion, making it impossible to obtain the desired optical constants. Accordingly, a preferred range of the BaO content is 7% to 12.5%. A further preferred range of the BaO content is 8% to 12.4%, a particularly preferred range being 9% to 12.4%.

MgO has the effects of adjusting the optical constants and lowering the liquid phase temperature (TL). A MgO content more than 14% diminishes resistance to devitrification. Accordingly, a preferred range of the MgO content is 0% to 14%. A further preferred range of the MgO content is 0% to 12%, a particularly preferred range being 0% to 10%.

$Li_2O$ is an essential ingredient of an optical glass according to the invention, and has the effect of lowering the liquid phase temperature (TL). A $Li_2O$ content more than 0.4% diminishes resistance to devitrification. Accordingly a preferred range of the $Li_2O$ content is 0% to 0.4%.

$La_2O_3$ is an essential ingredient of an optical glass according to the invention, and is one which increases the refractive index while keeping low dispersion; it also has the effects of increasing the Vickers hardness and stabilizing the glass. A $La_2O_3$ content less than 15% does not provide those effects. By contrast, a $La_2O_3$ content more than 34% diminishes resistance to devitrification. Accordingly, a preferred range of the $La_2O_3$ content is 15% to 34%. A further preferred range of the $La_2O_3$ content is 18% to 33.5%, a particularly preferred range being 20% to 33.5%.

$Y_2O_3$, like $La_2O_3$, is an essential ingredient of an optical glass according to the invention, and is one which increases the refractive index while keeping low dispersion. Moreover, when contained along with $La_2O_3$, $Y_2O_3$ has the effect of lowering the liquid phase temperature (TL). A $Y_2O_3$ content less than 3.5% does not provide those effects. By contrast, a $Y_2O_3$ content more than 10% diminishes resistance to devitrification. Accordingly, a preferred range of the $Y_2O_3$ content is 3.5% to 10%. A further preferred range of the $Y_2O_3$ content is 3.5% to 9%. A preferred range of the content ratio $Y_2O_3/(La_2O_3+Y_2O_3)$ of $La_2O_3$ to $Y_2O_3$ is 0.05 to 0.32.

$TiO_2$ is an essential ingredient of an optical glass according to the invention, and has the effects of increasing the refractive index, improving resistance to devitrification, and lowering the liquid phase temperature (TL). A $TiO_2$ content less than 8% does not provide those effects. By contrast, a $TiO_2$ content more than 13.5% notably colors the glass. Accordingly, a preferred range of the $TiO_2$ content is 8% to 13.5%. A further preferred range of the $TiO_2$ content is 9% to 13.4%, a particularly preferred range being 10% to 13.4%.

$ZrO_2$, like $TiO_2$, has the effects of increasing the refractive index and improving resistance to devitrification. A $ZrO_2$ content more than 7% diminishes resistance to devitrification. Accordingly, a preferred range of the $ZrO_2$ content is 0% to 7%. A further preferred range of the $ZrO_2$ content is 0% to 6.5%, $Nb_2O_5$ has the effects of increasing the refractive index and improving chemical durability. A $Nb_2O_5$ content more than 11% diminishes resistance to devitrification, and notably colors the glass. Accordingly, a preferred range of the $Nb_2O_5$ content is 0% to 11%. A further preferred range of the $Nb_2O_5$ content is 0% to 10%, a particularly preferred range being 0% to 9%.

$WO_3$ is an essential ingredient of an optical glass according to the invention, and has the effects of increasing the refractive index and improving resistance to devitrification; it also has the effect of increasing the Vickers hardness and lowering the liquid phase temperature (TL). A $WO_3$ content less than 1% does not provide those effects. By contrast, a $WO_3$ content more than 9% notably colors the glass, and diminishes chemical durability. Accordingly, a preferred range of the $WO_3$ content is 1% to 9%. A further preferred range of the $WO_3$ content is 1% to 8%, a particularly preferred range being 1.5% to 8%.

From the viewpoints of coloring of the glass and resistance to devitrification, the total content of $La_2O_3$, $Y_2O_3$, $ZrO_2$, $Nb_2O_5$, and $WO_3$ is preferably 54% or less.

Except the ingredients enumerated above, an optical glass according to the invention contains substantially no ingredients that are commonly used in optical glasses (such as $P_2O_5$, CaO, ZnO, $Gd_2O_3$, $Ta_2O_5$, $Bi_2O_3$, etc.). This, however, does not exclude an optical glass according to the invention containing any of these ingredients in such an amount as not to affect the properties of the glass. In that case, it is preferable that the total content of $B_2O_3$, $SiO_2$, $GeO_2$, BaO, MgO, $Li_2O$, $La_2O_3$, $Y_2O_3$, $TiO_2$, $ZrO_2$, $Nb_2O_5$ and $WO_3$ be 98.0% or more, and further preferably 99.0% or more, and particularly preferably 99.9% or more.

Substantially no CaO, ZnO, or $Ta_2O_5$ is contained because these raise the liquid phase temperature (TL). Substantially no $P_2O_5$, $Gd_2O_3$, or $Bi_2O_3$ is contained from the viewpoint of resistance to devitrification.

It is preferable that no PbO, $As_2O_3$, $Sb_2O_3$, $TeO_2$, or fluorides be contained at all from the viewpoint of keeping the fabrication environment safe and friendly to workers.

Restricting the ranges of the contents of different ingredients as noted above makes it possible to realize, without using compounds such as PbO, $TeO_2$, etc. that are suspected to be hazardous to human health, optical glasses that, despite offering high-refraction, low-dispersion optical constants, have liquid phase temperatures (TL) low enough to ensure satisfactory dripping properties of molten glass and Vickers hardnesses (Hv) great enough to make a crack in a succeeding process less likely and that are thus suitable for press-molding. Preferably, these optical glasses have refractive indices (nd) in the range of 1.83 to 1.94, Abbe numbers (vd) in the range of 26 to 35, liquid phase temperatures (TL) of 1000° C. or less, and Vickers hardnesses (Hv) of 770 or more.

Using optical glasses according to the invention as the material for optical elements (lenses, prisms, mirrors, etc.) incorporated in optical devices such as digital cameras and camera-equipped cellular phones helps give the optical elements higher refractive indices and make them slimmer, and thus contributes to size reduction of the optical devices. Lowering the liquid phase temperature (TL) to 1000° C. or less makes devitrification less likely to occur and allows stable dripping; it also helps lower the temperature of the press mold, prolonging the life of the mold and reducing production costs. Increasing the Vickers hardness (Hv) to 770 or more helps make a crack or a chip less likely to develop on the ground surface; it thus increases the proportion of products that turn out to be acceptable after processing of glass, leading to improved productivity.

Optical elements according to the invention are fabricated by press-molding optical glasses as described above. As mentioned earlier, press-molding roughly divides between a direct-press method, in which molten glass is dripped through a nozzle into a mold heated to a predetermined temperature to be press-molded; and a re-heating method, in which a preform material is placed on a mold, is heated to above the glass softening point, and is then press-molded. These methods eliminate the need for grinding or polishing processes, leading to improved productivity, and also make it possible to fabricate optical elements having difficult-to-form shapes, such as ones having free-form surfaces or aspherical surfaces, thus contributing to cost reduction.

EXAMPLES

Hereinafter, the composition and other features of optical glasses according to the invention will be described in more detail by way of, among others, Practical Examples 1 to 22 and Comparison Examples 1 to 4. Comparison Examples 1, 2, 3, and 4 are respectively to confirm Example 14 of Patent Document 1, Example 10 of Patent Document 2, Example 10 of Patent Document 3, and Example 6 of Patent Document 4.

Common source materials for glass, such as oxides, carbonates, and nitrates, in the form of powder were mixed sufficiently to be blended into blended materials having different target compositions (in percent by weight) as shown in Tables 1 to 4. Each of these blended materials was placed in a melting furnace heated to 1000° C. to 1400° C., where it was melted, clarified, and stirred to be homogenous, and was then dripped into a preheated iron mold and then slowly cooled to produce a sample. Each sample was tested for its refractive index for the d-line (nd), Abbe number (vd), Vickers hardness (Hv), and liquid phase temperature (TL). The results of the tests are shown together in Tables 1 to 4.

(1) Refractive Index (nd) and Abbe Number (vd)

As mentioned above, the molten glass dripped into the mold was cooled slowly at a rate of −2.3° C./hour. Each sample was tested on a "KPR-2000" refractometer manufactured by Kalnew Optical Industrial Co., Ltd.

(2) Vickers Hardness

Each sample was tested on an "HM-112" Vickers microhardness tester manufactured by Akashi Co., Ltd. under the conditions: measurement duration, 15 seconds; measurement load, 100 g.

(3) Liquid Phase Temperature (TL)

To test each sample for its liquid phase temperature (TL), the molten glass dripped into the mold was first kept for 12 hours in a devitrification testing furnace with a temperature slope of 800° C. to 1400° C.; the glass was then cooled down to room temperature, and then the inside of the glass was inspected on an optical microscope (BX50) manufactured by Olympus Corporation at a magnification of 40x. The temperature at which no devitrification (no crystal) was any longer recognized inside the glass was taken as the liquid phase temperature (TL).

TABLE 1

Practical Examples 1 to 8

| | PRACTICAL EXAMPLE | | | | | | | |
|---|---|---|---|---|---|---|---|---|
| | 001 | 002 | 003 | 004 | 005 | 006 | 007 | 008 |
| $B_2O_3$ | 18.20 | 16.00 | 18.20 | 17.80 | 19.40 | 17.80 | 17.20 | 19.30 |
| $SiO_2$ | 4.50 | 5.00 | 4.50 | 4.50 | 4.50 | 5.00 | 5.50 | 4.70 |
| $GeO_2$ | | | | | | | | |

TABLE 1-continued

Practical Examples 1 to 8

| | PRACTICAL EXAMPLE | | | | | | | |
|---|---|---|---|---|---|---|---|---|
| | 001 | 002 | 003 | 004 | 005 | 006 | 007 | 008 |
| BaO | 12.40 | 11.00 | 12.40 | 12.40 | 12.40 | 12.40 | 12.20 | 12.10 |
| MgO | | 3.50 | | | | 2.40 | 1.30 | |
| $Li_2O$ | 0.40 | 0.20 | 0.40 | 0.40 | 0.40 | 0.40 | 0.30 | 0.40 |
| $La_2O_3$ | 29.95 | 28.80 | 31.00 | 32.60 | 31.39 | 33.48 | 32.20 | 32.18 |
| $Y_2O_3$ | 6.55 | 5.40 | 5.50 | 8.80 | 5.11 | 5.32 | 5.00 | 5.22 |
| $TiO_2$ | 13.40 | 10.50 | 13.40 | 13.40 | 13.40 | 13.40 | 13.20 | 13.20 |
| $ZrO_2$ | 4.40 | 6.40 | 5.80 | 5.40 | 4.80 | | 5.00 | 5.10 |
| $Nb_2O_5$ | 6.40 | 7.70 | 7.00 | | 6.00 | 6.00 | 6.50 | 4.85 |
| $WO_3$ | 3.80 | 5.50 | 1.80 | 4.70 | 2.60 | 3.80 | 1.60 | 2.95 |
| TOTAL (wt %) | 100.00 | 100.00 | 100.00 | 100.00 | 100.00 | 100.00 | 100.00 | 100.00 |
| $B_2O_3/SiO_2$ | 4.0 | 3.2 | 4.0 | 4.0 | 4.3 | 3.6 | 3.1 | 4.1 |
| $La_2O_3 + Y_2O_3 + ZrO_2 + Nb_2O_5 + WO_3$ | 51.10 | 53.80 | 51.10 | 51.50 | 49.90 | 48.60 | 50.30 | 50.30 |
| nd | 1.89765 | 1.88892 | 1.89851 | 1.89040 | 1.88880 | 1.88719 | 1.88976 | 1.89112 |
| vd | 30.48 | 31.67 | 30.57 | 30.41 | 30.94 | 30.92 | 30.31 | 30.67 |
| LIQUID PHASE TEMPERATURE (TL) ° C. | 980 | 990 | 990 | 960 | 950 | 970 | 980 | 970 |
| VICKERS HARDNESS (Hv) | 799 | 797 | 803 | 785 | 781 | 792 | 791 | 801 |

TABLE 2

Practical Examples 9 to 15

| | PRACTICAL EXAMPLE | | | | | | |
|---|---|---|---|---|---|---|---|
| | 009 | 010 | 011 | 012 | 013 | 014 | 015 |
| $B_2O_3$ | 18.80 | 19.00 | 18.50 | 16.70 | 18.20 | 12.00 | 16.70 |
| $SiO_2$ | 5.20 | 4.60 | 4.50 | 4.50 | 4.50 | 6.50 | 6.80 |
| $GeO_2$ | | | | | | 4.00 | |
| BaO | 12.40 | 10.50 | 12.20 | 12.20 | 12.40 | 9.00 | 12.00 |
| MgO | | | | | 1.30 | 6.00 | 1.70 |
| $Li_2O$ | 0.40 | 0.40 | 0.40 | 0.40 | 0.40 | 0.40 | 0.40 |
| $La_2O_3$ | 31.22 | 31.99 | 26.20 | 31.39 | 28.77 | 23.40 | 32.80 |
| $Y_2O_3$ | 5.08 | 5.31 | 8.90 | 5.11 | 7.73 | 8.10 | 3.70 |
| $TiO_2$ | 13.00 | 13.40 | 13.40 | 13.40 | 13.40 | 12.50 | 13.40 |
| $ZrO_2$ | 5.50 | 5.00 | 6.20 | 6.30 | 4.80 | 6.00 | 3.50 |
| $Nb_2O_5$ | 4.50 | 6.00 | 7.40 | 8.00 | 6.00 | 10.00 | 6.20 |
| $WO_3$ | 3.90 | 2.80 | 2.30 | 2.00 | 2.50 | 2.10 | 2.80 |
| TOTAL (wt %) | 100.00 | 99.00 | 100.00 | 100.00 | 100.00 | 100.00 | 100.00 |
| $B_2O_3/SiO_2$ | 3.6 | 4.1 | 4.1 | 3.7 | 4.0 | 1.8 | 2.5 |
| $La_2O_3 + Y_2O_3 + ZrO_2 + Nb_2O_5 + WO_3$ | 50.20 | 51.10 | 51.00 | 52.80 | 49.80 | 49.60 | 49.00 |
| nd | 1.89762 | 1.90768 | 1.89134 | 1.81752 | 1.88922 | 1.90910 | 1.88305 |
| vd | 30.81 | 30.78 | 30.88 | 30.31 | 31.06 | 30.06 | 31.21 |
| LIQUID PHASE TEMPERATURE (TL) ° C. | 980 | 970 | 990 | 960 | 970 | 1000 | 990 |
| VICKERS HARDNESS (Hv) | 799 | 796 | 791 | 792 | 786 | 802 | 804 |

TABLE 3

Practical Examples 16 to 22

| | PRACTICAL EXAMPLE | | | | | | |
|---|---|---|---|---|---|---|---|
| | 016 | 017 | 018 | 019 | 020 | 021 | 022 |
| $B_2O_3$ | 13.00 | 16.70 | 19.40 | 19.30 | 16.90 | 19.40 | 19.20 |
| $SiO_2$ | 4.50 | 6.60 | 4.50 | 4.80 | 4.50 | 4.50 | 4.70 |
| $GeO_2$ | 2.60 | 1.20 | | | | | |
| BaO | 12.30 | 12.00 | 12.00 | 12.30 | 9.50 | 12.10 | 12.20 |
| MgO | 0.40 | 1.70 | 0.70 | 0.20 | 7.10 | 0.20 | |
| $Li_2O$ | | 0.40 | 0.40 | 0.10 | 0.40 | 0.30 | 0.40 |

TABLE 3-continued

Practical Examples 16 to 22

| | PRACTICAL EXAMPLE | | | | | | |
|---|---|---|---|---|---|---|---|
| | 016 | 017 | 018 | 019 | 020 | 021 | 022 |
| $La_2O_3$ | 24.24 | 28.90 | 33.15 | 29.80 | 31.39 | 33.40 | 31.52 |
| $Y_2O_3$ | 6.46 | 6.70 | 5.05 | 8.70 | 5.11 | 3.60 | 5.68 |
| $TiO_2$ | 13.30 | 13.40 | 10.50 | 13.30 | 13.40 | 13.40 | 13.40 |
| $ZrO_2$ | 6.50 | 4.60 | 5.30 | 4.30 | 3.00 | 4.90 | 4.80 |
| $Nb_2O_5$ | 8.80 | 6.00 | 5.80 | 5.60 | 6.00 | 5.90 | 5.50 |
| $WO_3$ | 7.90 | 1.80 | 3.20 | 1.60 | 2.70 | 2.30 | 2.60 |
| TOTAL (wt %) | 100.00 | 100.00 | 100.00 | 100.00 | 100.00 | 100.00 | 100.00 |
| $B_2O_3/SiO_2$ | 2.9 | 2.5 | 4.3 | 4.0 | 3.8 | 4.3 | 4.1 |
| $La_2O_3 + Y_2O_3 + ZrO_2 + Nb_2O_5 + WO_3$ | 53.90 | 48.00 | 52.50 | 50.00 | 48.20 | 50.10 | 50.10 |
| nd | 1.91087 | 1.87277 | 1.87981 | 1.89021 | 1.87982 | 1.89564 | 1.88721 |
| vd | 29.90 | 31.29 | 31.89 | 31.08 | 31.82 | 30.73 | 31.04 |
| LIQUID PHASE TEMPERATURE (TL) ° C. | 990 | 1000 | 970 | 970 | 950 | 970 | 960 |
| VICKERS HARDNESS (Hv) | 812 | 798 | 793 | 793 | 789 | 788 | 780 |

TABLE 4

Comparison Examples 1 to 4

| | COMPARISON EXAMPLE | | | |
|---|---|---|---|---|
| | 001 | 002 | 003 | 004 |
| $B_2O_3$ | 13.50 | 17.59 | 13.20 | 14.00 |
| $SiO_2$ | | 1.35 | 6.60 | 5.00 |
| $Al_2O_3$ | | | | |
| $GeO_2$ | 13.50 | | | |
| BaO | | | 16.80 | 16.00 |
| MgO | | | | |
| CaO | | | | 2.00 |
| SrO | | | | 2.00 |
| ZnO | 20.00 | 13.70 | 2.70 | 1.00 |
| $Li_2O$ | | | | |
| $Na_2O$ | | | | |
| $K_2O$ | | | | |
| $La_2O_3$ | 26.00 | 25.60 | 36.20 | 35.00 |
| $Y_2O_3$ | | | | |
| $Gd_2O_3$ | | 12.21 | | |
| $TiO_2$ | 7.00 | 8.97 | 13.40 | 13.00 |
| $ZrO_2$ | 4.50 | | 5.70 | 7.00 |
| $Nb_2O_5$ | 15.50 | | 5.40 | 5.00 |
| $Ta_2O_5$ | | 4.96 | | |
| $WO_3$ | | 15.62 | | |
| $Bi_2O_3$ | | | | |
| TOTAL (wt %) | 100.00 | 100.00 | 100.00 | 100.00 |
| nd | 1.92383 | 1.89406 | 1.90574 | 1.89747 |
| vd | 29.52 | 31.06 | 30.75 | 31.44 |
| LIQUID PHASE TEMPERATURE (TL) ° C. | 1050 | 1040 | 1080 | 1080 |
| VICKERS HARDNESS (Hv) | 728.2 | 736.8 | 739.5 | 730.0 |

The results above reveal the following. With Practical Examples 1 to 22 (Tables 1 to 3), the refractive indices (nd) were within the range of 1.83 to 1.94; the Abbe numbers (vd) were in the range of 26 to 35; the liquid phase temperatures (TL) were 1000° C. or less; and the Vickers hardnesses (Hv) were 770 or more. By contrast, with comparison examples 1 to 4 (Table 4), the liquid phase temperatures (TL) were 1000° C. or more; and the Vickers hardnesses (Hv) were 770 or less.

The invention claimed is:
1. An optical glass comprising, by weight:
16% to 19.5% of $B_2O_3$;
4.5% to 9% of $SiO_2$;
0% to 10% of $GeO_2$;
7% to 12.5% of BaO;
0% to 14% of MgO;
0% to 0.4% of $Li_2O$;
15% to 34% of $La_2O_3$;
3.5% to 10% of $Y_2O_3$;
8% to 13.5% of $TiO_2$;
0% to 7% of $ZrO_2$;
0% to 11% of $Nb_2O_5$; and
1% to 9% of $WO_3$, wherein
$La_2O_3 + Y_2O_3 + ZrO_2 + Nb_2O_5 + WO_3$ equals 54% or less, and

$B_2O_3+SiO_2+GeO_2+BaO+MgO+Li_2O+La_2O_3+Y_2O_3+TiO_2+ZrO_2+Nb_2O_5+WO_3$ equals 98% or more.

2. The optical glass according to claim 1, comprising 4.5% to 8% by weight of $SiO_2$.

3. The optical glass according to claim 1, comprising 0% to 8% by weight of $GeO_2$.

4. The optical glass according to claim 1, comprising 8% to 12.4% by weight of BaO.

5. The optical glass according to claim 1, comprising 0% to 12% by weight of MgO.

6. The optical glass according to claim 1, comprising 18% to 33.5% by weight of $La_2O_3$.

7. The optical glass according to claim 1, comprising 3.5% to 9% by weight of $Y_2O_3$.

8. The optical glass according to claim 1, comprising 9% to 13.4% by weight of $TiO_2$.

9. The optical glass according to claim 1, comprising 0% to 6.5% by weight of $ZrO_2$.

10. The optical glass according to claim 1, comprising 0% to 10% by weight of $Nb_2O_5$.

11. The optical glass according to claim 1, comprising 1% to 8% by weight of $WO_3$.

12. The optical glass according to claim 1, wherein $B_2O_3+SiO_2+GeO_2+BaO+MgO+Li_2O+La_2O_3+Y_2O_3+TiO_2+ZrO_2+Nb_2O_5+WO_3$ equals 99% or more.

13. The optical glass according to claim 1, comprising 16% to 19.4% by weight of $B_2O_3$.

14. The optical glass according to claim 1, comprising 20% to 33.5% by weight of $La_2O_3$.

15. An optical glass according to claim 1, wherein
the optical glass has
a refractive index (nd) in a range of 1.83 to 1.94,
an Abbe number (vd) in a range of 26 to 35,
a liquid phase temperature (TL) of 1000° C. or less, and
a Vickers hardness (Hv) of 770 or more.

16. An optical element comprising the optical glass according to claim 1.

17. An optical element comprising the optical glass according to claim 15.

18. An optical element fabricated by press-molding the optical glass according to claim 1.

19. An optical element fabricated by press-molding the optical glass according to claim 15.

20. The optical glass according to claim 1, comprising, $B_2O_3/SiO_2$ by weight equals 2.5 or more.

21. An optical glass comprising, by weight:
19.5% or less of $B_2O_3$;
4.5% or more of $SiO_2$;
0% to 10% of $GeO_2$;
7% to 12.5% of BaO;
0% to 14% of MgO;
0% to 0.4% of $Li_2O$;
15% to 34% of $La_2O_3$;
3.5% to 10% of $Y_2O_3$;
8% to 13.5% of $TiO_2$;
0% to 7% of $ZrO_2$;
0% to 11% of $Nb_2O_5$; and
1% to 9% of $WO_3$, wherein
$B_2O_3/SiO_2$ equals 2.5 or more,
$La_2O_3+Y_2O_3+ZrO_2+Nb_2O_5+WO_3$ equals 54% or less, and
$B_2O_3+SiO_2+GeO_2+BaO+MgO+Li_2O+La_2O_3+Y_2O_3+TiO_2+ZrO_2+Nb_2O_5+WO_3$ equals 98% or more.

22. The optical glass according to claim 21, comprising:
12% to 19.5% by weight of $B_2O_3$; and
4.5% to 7% by weight of $SiO_2$.

* * * * *